United States Patent [19]
Wagner

[11] 3,867,373
[45] Feb. 18, 1975

[54] EXTREMELY LOW VISCOSITY ADDUCTS OF LACTAMS WITH WATER OR OXIMES

[75] Inventor: Kuno Wagner, Leverkusen-Steinbuechel, Germany

[73] Assignee: Bayer Aktiengesellschaft, Leverkusen, Germany

[22] Filed: Dec. 13, 1971

[21] Appl. No.: 207,560

[30] Foreign Application Priority Data
Dec. 17, 1970 Germany............................ 2062289

[52] U.S. Cl.................. 260/3 R, 260/293.86, 260/326.5 FN, 260/326.5 FL, 252/364
[51] Int. Cl............................................ C07d 53/06
[58] Field of Search..................260/3 R, 293.86, 260/326.5 FN; 252/364

[56] References Cited
OTHER PUBLICATIONS

Chemical Abstracts, Vol. 67 (1967), page 2495, Abstracting Manczinger et al., Period Polytech., Chem. Eng. (Budapest) Vol. 10(2) pages 183–195, (1966).

Chemical Abstracts, Vol. 67 (1967), page 3470, Abstracting Soldatenko et al. in "Teplofin. Svoistva Veshchestv, akd. Nauk Ukr. SSR, Res pub. Mezhvedom. Sb. (1966), pages 165–173 (Russian).

*Primary Examiner*—Henry R. Jiles
*Assistant Examiner*—Robert T. Bond
*Attorney, Agent, or Firm*—Burgess, Dinklage & Sprung

[57] ABSTRACT

Adducts useful as solvents are prepared from lactams and water and/or oximes. Solutions of the adducts in the lactam, water or oxime are also disclosed as well as a process for preparing the adducts and solutions thereof.

13 Claims, No Drawings

3,867,373

EXTREMELY LOW VISCOSITY ADDUCTS OF LACTAMS WITH WATER OR OXIMES

BACKGROUND

This invention relates to adducts of lactams with hydroxyl compounds, such as water and/or ketoximes and aldoximes, to a process for the production thereof, and to the use thereof as solvents for substances that are substantially insoluble or completely insoluble in water or organic solvents and, more particularly, to the use thereof as inert or activated reactive solvents for carrying out special polymerisation, polyaddition and polycondensation reactions.

The novel adducts contain 1 mol of water or oxime per mol of lactam.

It has already been proposed to use molten ε-caprolactam (m.p. 70°C) as a solvent for substantially insoluble, relatively high molecular weight substances, for example polymethylene thioureas, optionally in conjunction with inert organic solvents free from hydroxyl groups, such as aromatic hydrocarbons, acetone, ethers, esters, tetrahydrofuran and aliphatic halohydrocarbons (H. Staudinger and K. Wagner, German Patent 910,336, issued Sept. 26, 1951).

Disadvantages of this solvent, or of the aforementioned mixtures, include the relatively high melting point of ε-caprolactam, and the very marked tendency of caprolactam to crystallise at temperatures below 70°C, with the result that it is impossible to prepare solutions which are storage-stable.

SUMMARY

Surprisingly, it has been found that a stable, extremely low viscosity adduct, or a solution thereof, can be obtained by reacting a lactam having the general formula:

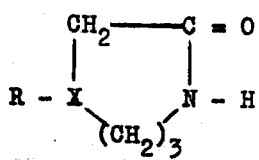

in which
X represents a CH group, and
R represents hydrogen; or
X represents a nitrogen atom, and
R represents an aliphatic radical, cycloaliphatic radical, an araliphatic radical or a pyridyl radical optionally substituted by lower alkyl radicals,
with a hydroxy compound, such as water and/or a ketoxime or aldoxime, so that 0.3 to 4 mols of the aforementioned hydroxyl compound is used per mol of the lactam or azalactam. A solution of the new adduct can, of course, be formed in excess lactam or in excess hydroxyl compound.

The quantity of hydroxyl compound is preferably such that there are 1 to 3 mols, preferably 1 mol, available per mol of lactam.

The process of the invention is carried out at a temperature from room temperature to 100°C, preferably at a temperature of from 20° to 80°C, most preferably at a temperature of from 50° to 60°C.

DESCRIPTION

In the context of the invention, aliphatic radicals (R) are optionally branched alkyl radicals containing 1 to 4, preferably 1 or 2, carbon atoms; cycloaliphatic radicals containing 5 to 12, preferably 5 or 6, carbon atoms in the ring. Araliphatic radicals contain 1 to 4, preferably 1 or 2, carbon atoms in the aliphatic chain, whilst the aromatic radical is preferably the phenyl or naphthyl radical containing 6 to 10 carbon atoms.

The majority of the hydroxyl compounds used in the process according to the invention can be characterised by the general formula:

in which
Y represents hydrogen or the radical

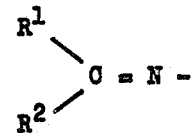

in which
R¹ and R², which can be the same or different, represent hydrogen, $C_1$ to $C_{12}$ alkyl radicals which optionally may form together a 5- or 6-membered carbocyclic ring which can optionally contain a double bond or an aralkyl radical.

Preferred alkyl radicals ($R^1$ and $R^2$) are those containing 1 to 5 carbon atoms. The benzyl radical is the preferred aralkyl radical. Preferred hydroxyl compounds (YOH) are water and those in which $R^1$ and $R^2$ are the same or different and represent $CH_3$, $C_2H_5$, $C_3H_7$ or $C_4H_9$, or together with the carbon atom to which they are attached also form the cyclohexylidene radical.

To prepare the new addition compounds of ε-caprolactam and the aforementioned azalactams with water or with ketoximes and aldoximes, the cyclic lactam, preferably ε-caprolactam or the azalactam, preferably 1-N-methyl hexahydro-1,4-diazepin-3-one, can simply be mixed, rubbed or stirred with the aforementioned hydroxyl compound, optionally in the presence of a little heat, the addition compound being formed in a matter of minutes. As can be seen from the Examples, these addition compounds are often water-clear liquids with surprisingly low viscosities at room temperature or at slightly elevated temperatures and, for this reason, can be used as highly effective solvents and reagents for a variety of different materials.

The addition compounds can also be prepared, however, by concentrating aqueous solutions of a few percent (2 to 6) of ε-caprolactam and/or azalactam by distillation, and stopping distillation when there are from 1 to 4 mols of water per mol of, for example, ε-caprolactam in the low viscosity liquids.

It is, of course, also possible to introduce a volatile aldoxime or detoxime in vapour form, for example in vacuo, into the molten or liquid lactam or azalactam until the required ratio of lactam or azalactam and hydroxyl compound is reached. In addition, lactams can be dissolved in volatile organic solvents or mixed with the requisite hydroxyl compounds capable of addition, after which the organic solvent is removed by distillation. The addition compounds can also be prepared in situ by carrying out ketoxime- or aldoxime-formation from the corresponding aldehyde or ketone and hydroxylamine hydrochloride in the lactam itself or in a solution thereof in an inert solvent, subsequently removing water and solvent, after neutralization with aqueous NaOH, if desired, followed by filtration from sodium chloride. In addition, it is possible to employ lactam/ketoxime mixtures obtained by incomplete Beckmann rearrangement, bringing the quantity of compounds capable of addition to the required 1:1 or 1:2 ratio by the addition of lactam and/or ketoximes.

The novel adducts obtainable by the process according to the invention are extremely low viscosity, generally water-clear liquids which have a viscosity of from 2 to 160, preferably from 3 to 50, most preferably from 4 to 30, centipoises at a temperature of from room temperature to 50°C, more particularly at a temperature of from 15° to 35°C.

The extremely low viscosity of the particularly preferred adducts of ε-caprolactam with water or with the aforementioned aldoximes and ketoximes indicates that, to a large extent, hydrogen bonds are formed to give, for example, addition compounds of the type:

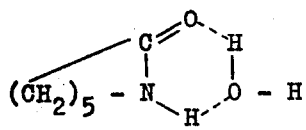

One particularly surprising aspect of the properties of the addition compounds according to the invention (this expression naturally also covers their solutions in excess lactam or excess hydroxyl compound) is the fact that the hydroxyl compounds present in the adducts, such as water which is by itself a very pronounced non-solvent for hydrophobic organic substances, completely loses their precipitating properties through adduct-formation in the new addition products. Thus, it is possible by virtue of the process according to the invention, either by varying the lactam or, more preferably, by varying the hydroxyl compound, which can either be either hydrophilic or hydrophobic, to produce solvents whose constitution is adapted to the substance to be dissolved, irrespective of whether it is, for example, a plant protection agent, a substantially insoluble dyestuff or a substantially insoluble optical brightener, so that maximum solubilities of these substantially insoluble substances can be obtained in this way.

When they are used as solvents, the addition compounds according to the invention based on lactams, water, ketoximes or aldoximes are also eminently suitable for dissolving in high concentration, both in water and in organic solvents, substantially insoluble urea derivatives, amides, semicarbazides, urethanes and polyurethanes, isocyanurates, cyanuric acid esters, reaction products of cyanuric acid chloride with a variety of different substituted aliphatic, cycloaliphatic and aromatic amino derivatives, purine derivatives, carbodiimides and polycarbodiimides. They also dissolve in water substantially insoluble plant protection agents such as O,O-diethyl-O-(2-quinoxalyl)-thiophosphate, a variety of different quinoxaline and quinazoline derivatives, and the compound known as 1-(3,4-dichloroanilino)-1-formylamino-2,2,2-trichloroethane which is effective against mildew.

The addition product of 1 mol of ε-caprolactam and 1 mol of water allows the solution and recrystallisation for purification purposes of, for example, cereal herbicides such as 1,3-dimethyl-3-(2-benzthiazolyl)-urea, whereby the herbicide is obtained in highly crystalline form. The addition compounds are also effective solvents and formulation aids for: O,O-diethyl-O-p-nitrophenyl esters of thiophosphoric acid; the addition product of chloral with dimethyl phosphite, imidazolines substituted in the 2-position, for example 2-heptadecyl imidazoline; imidazole; 2-methyl-imidazole; benzimidazole; mercaptobenzimidazole; 2,4-dichlorophenoxy acetic acid and derivatives such as its amides, for example the N-methylamide, N-ethylamide and N-butylamide; 2-methyl-4-chlorophenoxy acetic acid, its amide and N-substituted amides; 4-(2,4-dichlorophenoxy)-butyric acid; trichloroacetamide; 2,2-dichloropropionic acid; 2,2-dichloropropionamide; the N-methylol compounds of 2,2-dichloropropionamide; 2,2-dichloropropionamide-N-methylol methyl ether; chloroacetic acid diallyl amide; urethanes such as N-(3-chlorophenyl)-carbamic acid isopropyl ester; N-(4-chlorophenyl)-N,N'-dimethyl urea; urethanes of aromatic isocyanates optionally containing several chlorine atoms with isopropanol, or methyl isocyanate and isopropanol; halogenated triazines such as 2-chloro-4,6-bis-ethylamino-s-triazine; formyl compounds of amino guanidine; 3-aminotriazole, N-cyclohexyl-N-dimethyl urea; disodium ethylene-bis-dithiocarbamate, 5-chloro-2-hydroxybenzene-1-carboxylic acid-m-amyl amide; and the methylol compound of 5-chloro-2-hydroxybenzene-1-carboxylic acid amide.

The addition compounds according to the invention are also valuable solvents and formulating agents for a number of substantially insoluble dyestuffs, azo and anthraquinone dyes and, the H$_2$O-adducts are substantially non-flammable solvents for carrying out the recrystallisation and purification of commercial products.

The addition compounds according to the invention are also suitable for use as solvents for recrystallisation and purification of a number of well known optical brighteners of the 4,4'-diaminostilbene disulphonic acid series because, in many instances, they do not dissolve relatively high molecular weight impurities, whilst the suspended substances and impurities present in the commercial products are easy to filter off and, moreover, no colloidal solutions are formed. The solvents are also suitable for purifying a variety of different coumarin derivatives and optical brighteners of the pyrazoline series, for example compounds of the formula:

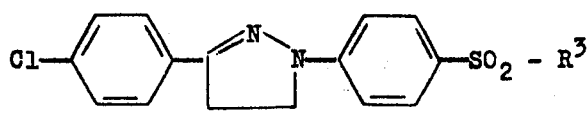

in which

R$^3$ = NH$_2$, —NH—CH$_2$CH$_2$OH or —(CH$_2$)$_2$-OH.

These compounds in particular can be very effectively purified from impurities by recrystallisation in the 1:1 addition products of ε-caprolactam and water.

Another particular advantage of these new solvents, especially the H$_2$O-adducts, is their miscibility with water, so that dissolved substances from a variety of different classes of compound can readily be precipitated and subsequently purified; and the solvent, for example caprolactam-H$_2$O, can be economically recovered, without discharge of toxic solvent vapours into the atmosphere, simply by removing water and concentrating to a caprolactam: water ratio of 1:1. Another aspect of particular interest is the increased level of safety in recrystallisation operations carried out on a large scale, because these addition compounds show reduced flammability and, in many instances, can only be ignited at extemely high temperatures. Another distinctive technical and practical advantage is the extremely low volatility, especially of the addition products of 1 mol of ε-caprolactam with 1 mol of water, and more particularly the substantially reduced toxic properties of ε-caprolactam and suitably selected hydroxyl compounds, such as water, in comparison, for example, with dimethyl formamide, dimethyl acetamide or dimethyl sulphoxide.

The high dissolving power of the addition compounds used as solvents in accordance with the invention for metal salts such as nickel chloride, iron chlorides, manganese-II-chloride, lithium chloride or lithium iodide; for hydrochlorides of a variety of different organic bases; or for betaine-like carbonic acid and dithiocarbonic acid salts of a variety of different organic amines and polyamines; enables the addition product to be used for special reactions, especially when the reaction conditions are selected under which, for example, ε-caprolactam or the hydroxyl compound used show little or no reaction. The high solubility and the possibility of preparing liquid calcium chloride solutions in the addition compounds according to the invention makes it possible to produce inorganic liquids which have hardly any corrosive effect, are effective against and quickly thaw ice and slippery surfaces and which, especially by virtue of being liquids, are easy to dispense and spray.

The novel addition compounds, especially 1:1 addition products of ε-caprolactam with water or ketoximes and aldoximes, afford several other advantages, moreover, in the field of polymerisation, copolymerisation and graft polymerisation of vinyl/or vinylidene monomers. They are particularly suitable for dissolving surprisingly large quantities of non-hydrophilic vinyl/or vinylidene monomers, for example vinyl chloride, vinylidene chloride, vinyl acetate, acrylic acid esters, styrene, α-methyl styrene, and chlorobutadiene, with the result that it is possible to carry out polymerisation reactions therein, giving concentrated solutions of the polymers, copolymers or graft polymers in these solvents. The addition compounds can also be used as effective solvents for already prepared polymers, copolymers or graft polymers from which the dissolved substances can readily be precipitated by the addition of water and equally readily purified.

It has also been found that when the additional compounds according to the invention are particularly suitable as reactive liquid solvents for carrying out fast polyaddition reactions of the kind encountered in epoxide chemistry, more particularly with a variety of different highly reactive polyamines containing primary and secondary amino groups, and also fast polycondensation reactions where the reactivity of the reagents is so high that sluggishly reacting caprolactam and the hydroxyl component used for adduct formation do not take part to any appreciable extent either in the polyaddition or in the polycondensation reaction. Examples of extremely fast reactions include polycondensations of N,N-carbamic acid chlorides with polyamines, phosgene with polyamines, polycarboxylic acid chlorides with polyamines, benzoquinone with polyamines, cyanuric acid chloride with polyamines and pyrimidine halides with polyamines. In this connection, working up of the polymers formed, especially in the addition products of 1 mol of ε-caprolactam with 1 to 3 mols of water, is very much easier than with other conventional solvents, in addition to which an outstanding facility for filtration or precipitation by the addition of water is obtained in the formation of extremely high molecular weight or pigment-like powdered solids.

The addition compounds according to the invention are also interesting solvents for carrying out fast reactions of the kind encountered in aminoplast and phenoplast chemistry, especially when these reactions take place at high velocity, and N-methylol lactams are preferentially formed, for example in the formation of powdered crosslinked hexahydrotriazines from hexamethylene diamine and formaldehyde or pentamethylene diamine and formaldehyde; condensation of benzoquinone and naphthoquinone with aliphatic, cycloaliphatic, araliphatic and aromatic diamines; and all alkaline catalysed phenol-formaldehyde condensation reactions, because the N-methylol caprolactam formed in this case is quantitatively reacted with elimination of formaldehyde to form thermostable o- or p-methylolated phenol or resol types so that, ultimately, the addition compounds according to the invention are continously regenerated.

The liquid addition compounds according to the invention are also eminently suitable for use as reaction media for carrying out condensation reactions of polycarboxylic acid esters or cyclic dicarboxylic acid anhydrides with polyamines, and for polycondensation reactions of amino acid esters and/or free amino acids amongst themselves, optionally in the presence of cyclohexyl carbodiimide.

The addition compounds according to the invention are extremely versatile in their practical application, their versatility being further increased by virtue of the fact that, as a rule, it is possible readily to dissolve and optionally recrystallise compounds which are capable of forming hydrogen bonds and which contain in the molecule or as a ring segment at least one of the following groups:

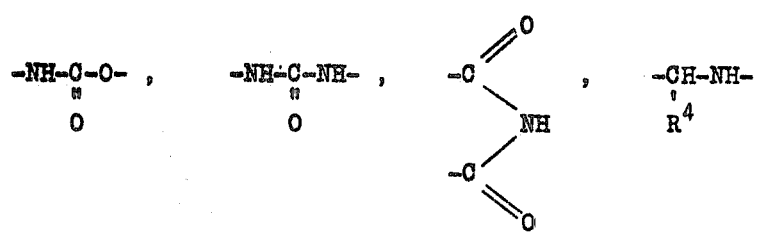

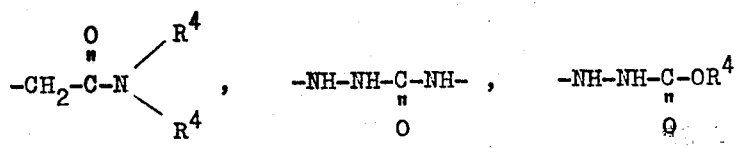

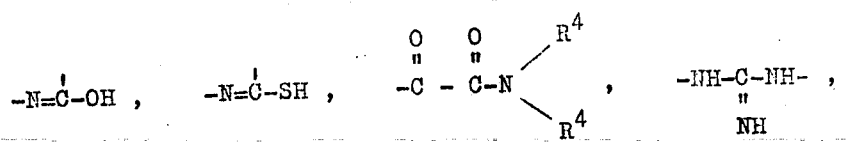

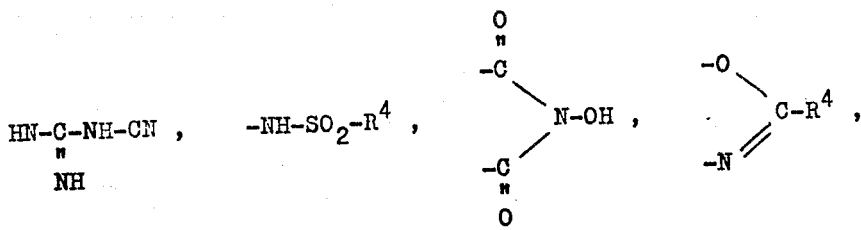

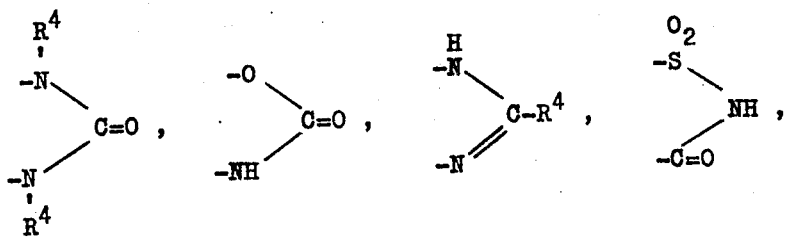

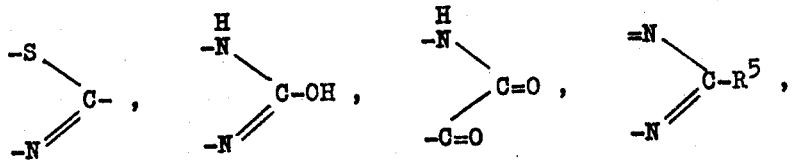

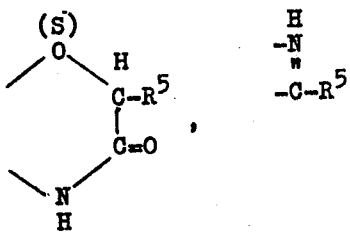

wherein
  R[4] represents hydrogen or an optionally substituted aliphatic, cycloaliphatic, araliphatic, aromatic or heterocyclic radical, and
  R[5] represents halogen or an amino, alkylamino, dialkylamino, hydroxy or mercapto group.

The parts quoted in the following Examples are parts by weight unless otherwise stated.

EXAMPLE 1

Batches of 1 mol of liquid, crystalline or molten lactams are each reacted at 50°C with the hydroxyl compounds mentioned in Table 1. Even when crystalline ε-caprolactam melting at 70°C is used, addition products which are water-clear and which have a low viscosity at 29°C, or solutions thereof, with a high dissolving power for a variety of different substances which are substantially insoluble or totally insoluble in water or organic solvents are obtained in every instance. The 1:1 addition compounds obtained, or their solutions, have the conspicuously low viscosities shown in the following Table.

Table 1

| No. | Lactam | Parts by weight | Hydroxyl Compound | Parts by weight | Molar ratio | η in centipoises |
|---|---|---|---|---|---|---|
| 1 | (CH₂)₅—NH, C=O | 113 | H₂O | 18 | 1:1 | 25.2 (29°C) |
| 2 | CH₃—N(CH₂)(CH₂)₃—NH, C=O | 128 | H₂O | 18 | 1:1 | 16.4 (45°C) |
| 3 | (CH₂)₅—NH, C=O | 113 | CH₃—C(=N-OH)—C₂H₅ | 87 | 1:1 | 20.5 (21°C) |
| 4 | (CH₂)₅—NH, C=O | 113 | C₆H₁₀=NOH | 113 | 1:1 | 37 (21°C) |
| 5 | CH₃—N(CH₂)(CH₂)₃—NH, C=O | 128 | C₆H₁₀=NOH | 113 | 1:1 | 12 (45°C) |
| 6 | (CH₂)₅—NH, C=O | 113 | C₆H₁₀=NOH | 169 | 1:1.5 | 48 (21°C) |
| 7 | (CH₂)₅—NH, C=O | 113 | C₆H₁₀=NOH | 226 | 1:2 | 42 (21°C) |
| 8 | (CH₂)₅—NH, C=O | 113 | CH₃—(CH₂)₂—CH=NOH | 87 | 1:1 | 29 (21°C) |
| 9 | (CH₂)₅—NH, C=O | 113 | H₂O | 36 | 1:2 | 24.8 (21°C) |
| 10 | (CH₂)₅—NH, C=O | 113 | (C₆H₅—CH₂)₂C=NOH | 225 | 1:1 | 19 (45°C) |
| 11 | (CH₂)₅—NH, C=O | 113 | C₆H₁₁—C(C₂H₅)=NOH | 155 | 1:1 | 44 (21°C) |
| 12 | (CH₂)₅—NH, C=O | 113 | C₆H₁₁—CH=NOH | 127 | 1:1 | 41 (21°C) |

Table 1 (continued)

| No. | Lactam | Parts by weight | Hydroxyl Compound | Parts by weight | Molar ratio | η in centipoises |
|---|---|---|---|---|---|---|
| 13. | (CH₂)₅⟨C=O / NH | 113 | H₂O | 54 | 1:3 | 13.5 (21°C) |
| 14. | CH₃-N–CH₂ / (CH₂)₃–C=O / NH | 128 | H₂O | 36 | 1:2 | 4.3 (45°C) |
| 15. | CH₃-N⟨CH₂–C=O / (CH₂)₃–NH | 128 | H₂O | 54 | 1:3 | 3.2 (45°C) |
| 16. | (CH₂)₅⟨C=O / NH | 113 | CH₃-(CH₂)₅\\C=NOH / CH₃-(CH₂)₅/ | 214 | 1:1 | 48 (29°C) |

The 1:1 addition products of ε-caprolactam with water mentioned in this Example have a low viscosity at temperatures above 29°C. The solutions of the addition compounds in an excess of water are low-viscosity solvents with a high dissolving power for substantially insoluble substances which only show a tendency towards crystallisation at temperatures below −4°C.

EXAMPLE 2

This Example demonstrates the surprisingly high activation of the water probably combined through hydrogen bridges:

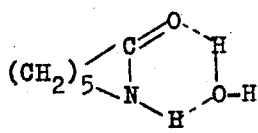

in ε-caprolactam/water (1:1) adduct in the reaction with isocyanates.

COMPARISON TEST

The comparison test shows that ε-caprolactam reacts very slowly with hexamethylene diisocyanate at temperatures of from 30° to 40°C. A measurement is taken on the period of time required to obtain a 50% isocyanate or caprolactam conversion in accordance with the following idealised reaction equation:

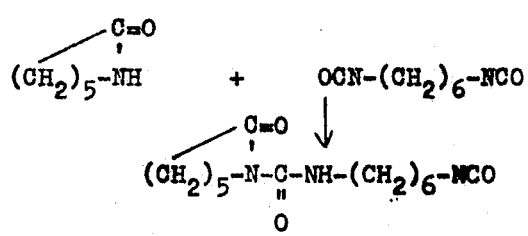

In order to obtain exact comparative figures, ε-caprolactam is dissolved in dioxan to form an 86% by weight solution in this test. Accordingly, the concentration in this solution corresponds to the ε-caprolactam concentration in the ε-caprolactam/water (1:1) addition compound (86% by weight of caprolactam).

33.9 Parts by weight of ε-caprolactam (0.3 mol) are dissolved together with 5.4 parts by weight of dioxan at 70°C to form an 86% by weight solution. The solution is cooled, followed by the 63. in one portion at around 40°C of 50.4 parts by weight (0.3 mol) of hexamethylene diisocyanate. It is noticeable that, despite spontaneous admixture, there is no increase in temperature, nor are there any signs of an increase in temperature after prolonged heating at 40°C. The NCO value of the reaction mixture falls very slowly and, over a period of 18 hours at 30°C, is reduced from 28.2% of NCO to 24% of NCO and, after another 24 hours, to 23.2% of NCO. Only after a total of 70 hours is the theoretical NCO value of approximately 21.2% NCO for half conversion of the ε-caprolactam reached. This test shows that ε-caprolactam is substantially non-reactive in the non-catalysed reaction with hexamethylene diisocyanate. Half-life time: 70 hours.

COMPARISON TEST 2

In order to obtain exact comparative figures for the non-catalysed water-hexamethylene diisocyanate reaction in accordance with the idealised equation:

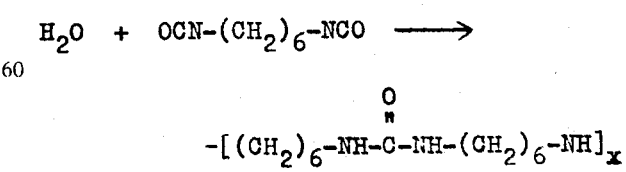

water is dissolved in dioxan in such a concentration that the concentration of the solution corresponds to the concentration of water in the caprolactam/water (1:1) adduct, i.e. to a concentration of 14% by weight.

The time required to obtain a 50% water conversion is measured (half-life time).

5.4 Parts by weight of water (0.3 mol) are mixed with 33.9 parts by weight of anhydrous dioxan to form a solution containing 14% by weight of water, followed by the addition in one portion at 22°C of 50.4 parts by weight of hexamethylene diisocyanate (0.3 mol). A very slow reaction begins without any appreciable rise in temperature, accompanied by polyurea formation. Half conversion of the water is obtained after as long as 10 hours, according to continuous NCO titration, and the reaction mixture shows an NCO value of 14.1% for half the water conversion. Half-life time: 10 hours.

COMPARISON TEST 3

If in comparison test 2 is the solvent dioxan is replaced by N-methyl caprolactam:

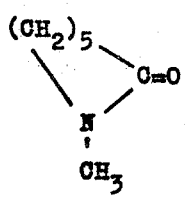

the addition compounds according to the invention cannot be formed. The half-life time for half conversion of the water is 10.5 hours. NCO value: 14.1%. cycle,

COMPARISON TEST 4

50.4 Parts by weight (0.3 mol) of hexamethylene diisocyanate are added in one portion at 26°C to 39.3 parts by weight (0.3 mol) of the ε-caprolactam/water (1:1) addition compound containing 14% by weight of water. The marked activation of the water is reflected in a sudden increase in temperature, which begins only 30 seconds after the mixing operation so that, in comparison with comparison tests 2 and 3, a temperature of 81°C is attained after only 1.5 minutes and a temperature of 130°C after 3 minutes, and the conversion is quantitative even in this short time.

If the same reaction is carried out with cooling at 25°C to determine the half-life time, a 50% water conversion is obtained after only about 1.8 minutes, in comparison with comparison tests 2 and 3. The test shows that there is extremely pronounced activation of the water in the ε-caprolactam/water (1:1) addition compound and that the reactivity, as measured by comparison of the half-life times, is about 333 times greater than it is in the dioxan/water or N-methyl-caprolactam/water system.

EXAMPLE 3

By way of adding to comparison test 4, this example shows that only the water component in the ε-caprolactam/water addition compound is activated, and that the reaction of hexamethylene diisocyanate in accordance with the equation:

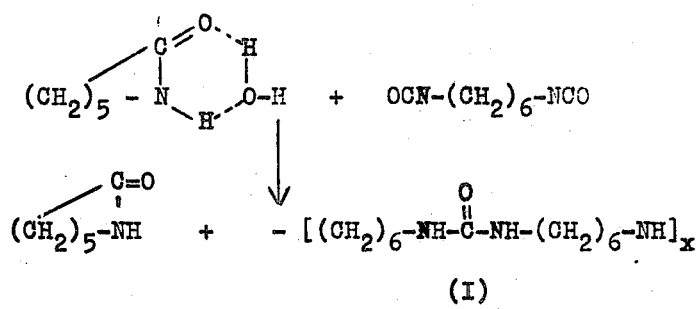

takes place selectively to an extent of more than 98% by weight to give insoluble polyureas (I), whilst, in consistency with comparison tests 1 and 3, ε-caprolactam is only chemically added in a very much smaller quantity to the diisocyanate. 39.9 Parts by weight (0.3 mol) of the ε-caprolactam/water (1:1) adduct are reacted with intensive cooling at 26°C with 50 parts by weight (0.3 mol) of hexamethylene diisocyanate. Polyureas of hexamethylene diisocyanate are precipitated after only a few seconds. The temperature is kept at room temperature for a period of 20 hours. Thereafter the product is diluted with 300 parts by weight of water and then filtered off from the polyurea. 41.7 g of polyurea is obtained, the elemental analysis being identical with that of the polyurea prepared from water and hexamethylene diisocyanate in the molar ratio 1:1. Yield: approximately 98% of the theoretical.

EXAMPLE 4

Batches of 113 parts by weight (1 mol) of ε-caprolactam are reacted with:

a. 18 parts by weight (1 mol) of water,
b. 36 parts by weight (2 mols) of water, substantially
c. 54 parts by weight (3 mols) of water, and
d. 72 parts by weight (4 mols) of water, giving low-viscosity liquids which, in cases (b) to cd), do not show any tendency towards crystallisation at 0°C, are miscible with one another in any ratio and, either as such or in admixture, are excellent solvents for water-insoluble compounds, for example, N-phenyl urea, N,N'-diphenyl urea and benzthiazolyl ureas. 10 to 30% by weight of the substantially insoluble substances are dissolved and obtained in crystallised form in the cold.

If 25 parts by weight of a substantially analytically pure optical brightener of the constitution:

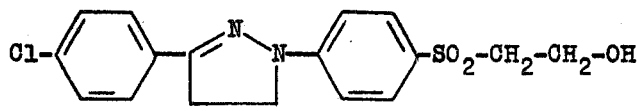

are dissolved in 100 parts by weight of a solution of the 1:1 addition compound of $\epsilon$-caprolactam and water in 0.2 mol of excess water at a temperature of 100°C, 0.5% by weight of resin-like brown coloured fractions can be readily separated off by filtration and the pyrazoline brightener is separated in the cold in the form of gold-yellow crystallites of high purity.

EXAMPLE 5

This Example shows that vinyl monomers, for example, can readily be dissolved in the addition product of $\epsilon$-caprolactam and water or its solutions (1:1, ), (1:2) or (1:3). Batches of 100 parts by weight of the addition product or its solution in excess water can be mixed with the following quantities of vinyl monomers without formation of two liquid phases:
 a. 130 parts by weight of vinyl acetate,
 b. 110 parts by weight of methyl methacrylate,
 c. 110 parts by weight of methyl acrylate,
 d. 105 parts by weight of ethyl acrylate,
 e. 110 parts by weight of styrene, and
 f. 130 parts by weight of acrylonitrile.

Accordingly, the high solubility of the aforementioned vinyl monomers in the addition compounds according to the invention enables polymerisation, copolymerisation and graft polymerisation reactions to be carried out in these solvents, with the advantage that the polymers obtained are easy to precipitate quantitatively by the addition of water or to purify by fractionation, and that the solvent used can readily be regenerated by concentration.

EXAMPLE 6

This Example demonstrates the advantageous use of the addition compounds according to the invention for carrying out fast condensation reactions.

The following diamines are dissolved in batches of 400 parts by weight of the solution, thinly liquid at room temperature, of the addition compound of 1 mol of $\epsilon$-caprolactam and 1.0 mol of water in an excess of 0.2 mol of water:
 a. 92 parts by weight of hexamethylene diamine,
 b. 92 parts by weight of hexamethylene diamine,
 c. 134 parts by weight of isophorone diamine,
 d. 100 parts by weight of ethylene diamine, and
 e. 100 parts by weight of 1,3-diaminopropane.

The following constituents are stirred over a period of 10 minutes into solutions (a) to (e):
 a. 0.2 mol of the bis-chlorocarbonic acid ester of 1,6-hexane diol,
 b. 0.2 mol of the bis-carbamic acid chloride of N,N'-diisopropyl hexamethylene diamine,
 c. 0.2 mol of a bis-chlorocarbonic acid ester of 1 mol of $\alpha,\omega$-dihydroxy polyethylene oxide with an average molecular weight of 2000 and 2 mols of phosgene,
 d. 0.2 mol of a bis-chlorocarbonic acid ester of 1 mol of $\alpha,\omega$-dihydroxy polybutylene oxide with an average molecular weight of 2000 and 2 mols of phosgene, and
 e. 0.2 mol of an $\alpha,\omega$-bis-carbamic acid chloride prepared from 1 mol of an $\alpha,\omega$-dihydroxy polyester of adipic acid and ethylene glycol with an average molecular weight of 2000, 2 mols of hexamethylene diisocyanate and 2 mols of anhydrous hydrochloric acid.

The $\alpha,\omega$-diamino diurethanes (75 parts by weight), $\alpha,\omega$-diamino diureas (61 parts by weight), $\alpha,\omega$-diamino diurethanes (225 parts by weight), $\alpha,\omega$-diamino diurethanes (210 parts by weight) and $\alpha,\omega$-diamino diurethane diureas (220 parts by weight), corresponding to (a) to (e) are obtained in substantially quantitative yields without any appreciable reaction of the caprolactam and without any appreciable reaction of the water present, being quantitatively precipitated from the $\epsilon$-caprolactam/water mixture by the addition of 800 parts by weight of water.

EXAMPLE 7

This Example demonstrates the high dissolving power of the caprolactam/water addition products for a variety of different hydrophobic $\alpha,\omega$-diurethanes with average molecular weights of from 2000 to 4000.

The following highly viscous $\alpha,\omega$-diurethanes, which can only be poured at 90°C, are dissolved at 90°C in batches of 250 parts by weight of a thinly liquid solution of the addition compound of 1 mol of $\epsilon$-caprolactam and 1.0 mol of water in 0.2 mol of excess water:
 a. 250 parts by weight of an $\alpha,\omega$-diurethane prepared from 2 mols of phenol and 1 mol of an $\alpha,\omega$-diisocyanato-diurethane prepared in known manner, for example in accordance with Example 1 of DAS No. 1,122,254, lines 55–62, column 3, from 1 mol of an $\alpha,\omega$-dihydroxy adipic acid/ethylene glycol polyester with an average molecular weight of 2000 and 2 mols of tolylene diisocyanate,
 b. 250 parts by weight of an $\alpha,\omega$-diurethane prepared from 2 mols of phenol and 1 mol of an $\alpha,\omega$-diisocyanato-diurethane obtained from 1 mol of an $\alpha,\omega$-dihydroxy polypropylene glycol with an average molecular weight of 2000 and 2 mols of 4,4'-diisocyanato diphenylmethane,
 c. 250 parts by weight of an $\alpha,\omega$-diurethane prepared from 2 mols of methanol and 1 mol of an $\alpha,\omega$-diisocyanato-diurethane obtained from 1 mol of an $\alpha,\omega$-dihydroxy polythioether of thiodiglycol and hexane diol (70:30) with an average molecular weight of 4000 and 2 mols of tolylene diisocyanate.

50% free-flowing solutions are obtained in each instance (a) to (c), showing the following remarkably low viscosities even at room temperature: comprising:
 a. 450 cP, 21°C
 b. 310 cP, 21°C
 c. 690 cP, 21°C.

EXAMPLE 8

This Example demonstrates the advantageous application of lactam/water adducts as solvents for carrying out basically-catalysed condensation reactions of the kind encountered in phenoplast chemistry.

222 Parts by weight of 2,2-bis-(4-hydroxyphenyl)-propane and 7 g of potassium carbonate are dissolved at 70°C in 700 parts by weight of a solution of the addition compound of 1 mol of $\epsilon$-caprolactam and 1.0 mol of water in 0.2 mol of excess water. 120 Parts by weight of paraformaldehyde are added with thorough stirring over a period of 2 hours at 70°C. This is followed by stirring for 2 hours at 90°C, after which the clear solution is left to cool and the highly methylolated 2,2-bis-(4-hydroxyphenyl)-propane is subsequently precipitated by the addition of 1700 parts by weight of water. A readily soluble uncrosslinked addition product containing, on average, 2.9 methylol groups per mol of 2,2-bis-(4-hydroxyphenyl)-propane is obtained in a yield of 308 parts by weight. If the aqueous phase separated off is freed from water, pure caprolactam is recovered, and, by reaction with 1.2 mols of water per mol of ε-caprolactam, can be reused as solvent for carrying out the described condensation reaction.

Although ε-caprolactam itself can readily be converted with formaldehyde in the presence of basic catalysts into N-methylol caprolactam, it is continuously regenerated during condensation, because methylolated 2,2-bis-(4-hydroxyphenyl)-propane is the thermally more stable compound. Despite its reactivity with respect to formaldehyde, therefore, the ε-caprolactam/water 1:1 addition compound is a true solvent.

EXAMPLE 9

Table 2 demonstrates the high dissolving power of the solutions of ε-caprolactam/H₂O 1:1 adducts in an excess of 1 mol of water on metal salts and salts of carbamic acids and dithiocarbonic acids.

EXAMPLE 10

Table 3 demonstrates the high dissolving power of ε-caprolactam/aldoxime and ketoxime (1:1) adducts on substantially insoluble ureas and biuret derivatives at 75°C.

EXAMPLE 11

The 1-N-substituted hexahydro-1,4-diasepin-3-ones used in the aforementioned Examples are prepared in accordance with the following method of production for 1-N-methyl hexahydro-1,4-diazepin-3-one being a generally applicable procedure for the synthesis of a variety of different 1-N-substituted azalactams, such as 1-N-ethyl hexahydro-1,4-diazepin-3-one, 1-N-butyl hexahydro-1,4-diazepin-3-one, 1-N-cyclohexyl-1,4-diazepin-3-one, 1-N-benzyl hexahydro-1,4-diazepin-3-one, and 1-N-(2-pyridyl)-hexahydro-1,4-diazepin-3-one.

1-N-methyl hexahydro-1,4-diazepin-3-one:

A solution of 750 g of N-methyl-N-(2-cyanoethyl)-glycine ethyl ester (prepared from methylaminopropionitrile and ethyl chloroacetate) in 1 litre of ethanol

Table 2

| No. | Lactam/OH compound | Salt | Concentration (% by weight) |
|---|---|---|---|
| 1 | ε-Caprolactam/water (1:2) | LiCl | 25 |
| 2 | " " | LiI | 45 |
| 3 | " " | MgCl₂ | 28 |
| 4 | " " | ZnCl₂ | 25 |
| 5 | " " | CaCl₂·H₂O | 18 |
| 6 | " " | [CH₃/H₃C–C–H–NH₂ / H₃C–CH₂–NHC–O–]⁻ | 25 |
|   |   | [H₃C/H₃C–C–H–NH₂ / H₃C–CH₂–NH₃]⁺ |   |

Table 3

| No. | Lactam/OH compound | Dissolved Compound | Concentration (% by weight) |
|---|---|---|---|
| 1 | ε-caprolactam/methyl ethyl ketoxime | $C_6H_5-NH-\overset{O}{\overset{\|}{C}}-NH-C_6H_5$ | 15 |
| 2 | ε-caprolactam/cyclohexanone oxime | $C_6H_5-NH-\overset{O}{\overset{\|}{C}}-NH_2$ | 20 |

TABLE 3 — Continued

| No. | Lactam/OH compound | Dissolved Compound | Concentration (% by weight) |
|---|---|---|---|
| 3 | ε-caprolactam/cyclohexanone oxime | 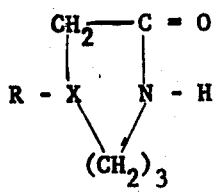 | 14 |
| 4 | ε-caprolactam/butyraldoxime | 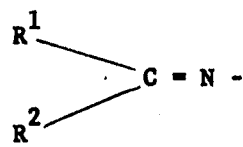 | 17 | is hydrogenated in the presence of 60 g of Raney cobalt in an autoclave at a temperature of 80° to 90°C and under a total pressure of 100 to 120 atms of hydrogen. The calculated quantity of hydrogen is absorbed after one hour. The hydrogenated solution is filtered off from the catalyst. The solid residue left after the ethanol has been filtered off is freed from any greases adhering to it with a little ethyl acetate, and the white product, which discolours very easily in air, is fractionated with 5 g of sodium methoxide in a high vacuum. The distillate obtained has a melting point of 91°C. Yield: 424 g (75% of the theoretical).

What is claimed is:

1. Adduct of a lactam having the formula

wherein
X is —CH— and R is hydrogen; or
X is nitrogen and
R is selected from the group of:
 alkyl having 1 to 4 carbon atoms;
 cycloalkyl having 5 or 6 carbon atoms in the ring;
 aralkyl having 1 or 2 carbon atoms in the alkyl portion and phenyl or naphthyl as the aromatic portion; pyridyl; and
 lower alkyl-substituted pyridyl,
with a hydroxyl compound having the formula $$Y-OH$$

wherein Y is hydrogen or $$\begin{array}{c} R^1 \\ \phantom{R}\diagdown \\ \phantom{RR}C-N- \\ \phantom{R}\diagup \\ R^2 \end{array}$$

wherein
$R^1$ and $R^2$, which can be the same or different, are selected from the group of hydrogen, $C_1$ to $C_{12}$ alkyl which together optionally may form a 5- or 6-membered carbocyclic ring which optionally can contain a double bond, and benzyl,
said adduct containing from 0.3 to 4 moles of said hydroxyl compound per mol of said lactam.

2. Adduct of claim 1 wherein the adduct contains 1 to 3 mols of said hydroxyl compound per mol of said lactam.

3. Adduct of claim 1 wherein the adduct contains 1 mol of said hydroxyl compound per mol of said lactam.

4. Adduct of claim 1 wherein the lactam is selected from the group of ε-caprolactam and 1-N-substituted hexahydro-1,4-diazepin-3-ones, said N-substituent being selected from the group of methyl, ethyl, butyl, cyclohexyl, benzyl and 2-pyridyl.

5. Adduct of claim 1 wherein $R^1$ and $R^2$ are the same or different and are each selected from the group of hydrogen, benzyl, alkyl having 1 to 5 carbon atoms, or together with the carbon atom to which they are attached form cyclohexylidene.

6. Adduct of claim 1 wherein the hydroxyl compound is selected from the group of water, methyl ethyl ketoxime, diethyl ketoxime, butyraldoxime and cylohexanone oxime.

7. Process for preparing the adduct of claim 1 which comprises contacting said lactam with from 0.3 to 4 mols, per mol of the lactam, of said hydroxyl compound at a temperature of from room temperature to 100°C.

8. Process of claim 7 wherein the amount of hydroxyl compound used is from 1 to 3 mols per mol of lactam.

9. Process of claim 7 wherein the amount of hydroxyl compound used is 1 mol per mol of lactam.

10. Process of claim 7 wherein the temperature is from 20° to 80°C.

11. Process of claim 7 wherein the temperature is from 50° to 60°C.

12. Process of claim 7 wherein the lactam is selected from the group of ε-caprolactam and 1-N-methyl hexahydro-1,4-diazepin-3-one and the hydroxyl compound is selected from the group of water, methyl ethyl ketoxime, diethyl ketoxime, butyraldoxide and cyclohexanone oxide.

13. The use of the adduct of claim 1 as a solvent.

* * * * *

UNITED STATES PATENT OFFICE
CERTIFICATE OF CORRECTION

Patent No. 3,867,373        Dated February 18, 1975

Inventor(s) Kuno Wagner

It is certified that error appears in the above-identified patent and that said Letters Patent are hereby corrected as shown below:

Column 12, line 36 "63." should read --addition--;

Column 13, line 44 "14.1%. cycle" should read --14.1%.--

Column   , line    "(b) to cd)" should read --b) to d)--

Column 15, line 44 delete "b. 92 parts by weight of heramethylene diamene,"

Column 16, line 46 "temperature: comprising:" should read --temperature:--

Column 17 Table 2 last line - $\overset{29}{\cancel{30}}$ should be deleted as it pertains to the number of the page in the specification.

UNITED STATES PATENT OFFICE
CERTIFICATE OF CORRECTION

Patent No. 3,867,373      Dated February 18, 1975

Inventor(s) Kuno Wagner      Page 2

It is certified that error appears in the above-identified patent and that said Letters Patent are hereby corrected as shown below:

Column 17, Table 2 insert as a last line:

--7   $\varepsilon$-Caprolactam/water (1:2)   dithiocarbonic acid salt of 2 mols of isophorone diamine and 1 mol of $CS_2$ --.     29--

Signed and Sealed this twenty-second Day of July 1975

[SEAL]

Attest:

RUTH C. MASON
*Attesting Officer*

C. MARSHALL DANN
*Commissioner of Patents and Trademarks*